Aug. 29, 1939.  L. G. S. BROOKER  2,170,805
PHOTOGRAPHIC EMULSION CONTAINING DYES FROM BENZOXAZOLES
Filed April 24, 1937

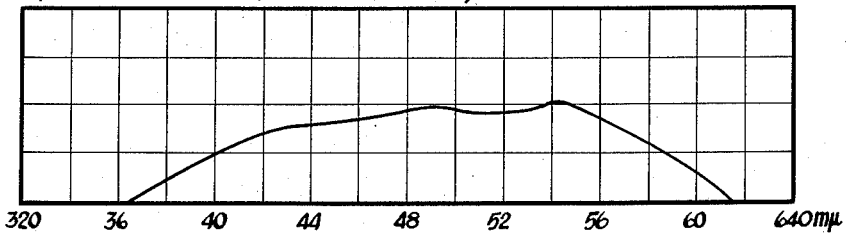

Fig.1.
5(2-Ethyl-1-Benzoxazylidene-Ethylidene)-Rhodanine.

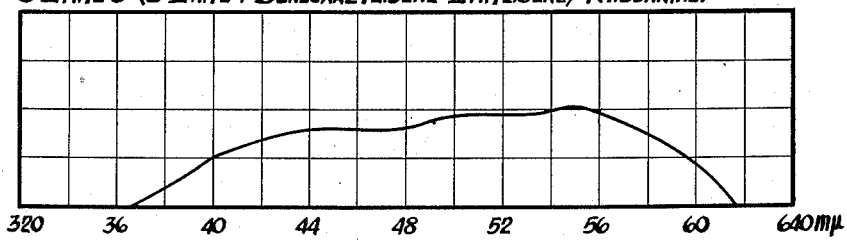

Fig.2.
3-Ethyl-5-(2-Ethyl-1-Benzoxazylidene-Ethylidene)-Rhodanine.

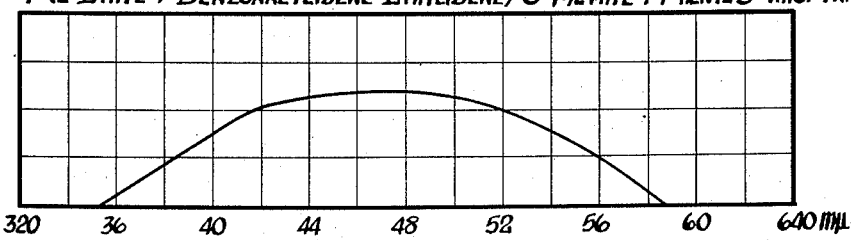

Fig.3.
4-(2-Ethyl-1-Benzoxazylidene-Ethylidene)-3-Methyl-1-Phenyl-5-Thiopyrazolone

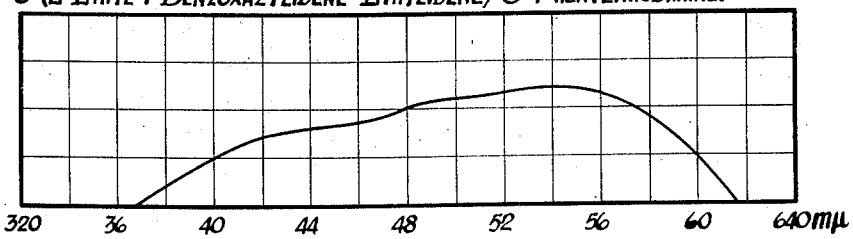

Fig.4.
5-(2-Ethyl-1-Benzoxazylidene-Ethylidene)-3-Phenylrhodanine.

Leslie G. S. Brooker,
INVENTOR:
BY N. M. Perrins
Daniel J. Mayne
ATTORNEYS.

Patented Aug. 29, 1939

2,170,805

UNITED STATES PATENT OFFICE 2,170,805

PHOTOGRAPHIC EMULSION CONTAINING DYES FROM BENZOXAZOLES

Leslie G. S. Brooker, Rochester, N. Y., assignor to Eastman Kodak Company, Rochester, N. Y., a corporation of New Jersey Application April 24, 1937, Serial No. 138,824

6 Claims. (Cl. 95—7)

This invention relates to photographic emulsions containing dyes from benzoxazoles and more particularly dyes of the merocyanine class and which are derived from benzoxazoles.

This application is a continuation-in-part of my copending application Serial No. 739,502, filed August 11, 1934 and also a continuation-in-part of my copending application Serial No. 752,036, filed November 8, 1934. Application 752,036 has now matured into Patent No. 2,078,233, dated April 27, 1937.

In my earlier filed copending application, dyes referred to as N-alkyl-heterocyclylidene-ethylidene derivatives of heterocyclic compounds containing a reactive methylene group are described, while in the second filed copending application, photographic emulsions made from such dyes are described. Such dyes belong to a broad class which has recently been named the merocyanine class. The N-alkyl-heterocyclylidene-ethylidene derivatives more specifically belong to a large sub-class recently named the merocarbocyanine sub-class. A smaller group of merocarbocyanines, viz. those derived from benzoxazoles, are described in the earlier filed of my above mentioned copending applications, while photographic emulsions made therefrom are described in my second filed copending application. The merocarbocyanine dyes derived from benzoxazoles are particularly useful dyes and can be incorporated in photographic emulsions to give emulsions characterized by new and useful sensitivity. It is with such new and useful emulsions made from merocarbocyanines derived from benzoxazoles that my instant application is concerned.

An object of my instant invention, therefore, is to provide new photographic emulsions, such as of the gelatino-silver-halide type. A further object is to provide new photographic emulsions sensitized with merocarbocyanine dyes derived from benzoxazoles. A still further object is to provide a photographic element coated with such new emulsions. Other more specific objects will appear hereinafter.

The dyes which go to make up the new emulsions of my instant invention can be represented by the following general formula:

wherein A represents an atom such as oxygen or sulfur, R represents an alkyl group, Y represents the non-metallic atoms necessary to complete a benzoxazole nucleus and Z represents the non-metallic atoms necessary to complete a five-membered or six-membered heterocyclic nucleus. More particularly, Z can represent the non-metallic atoms necessary to complete a rhodanine nucleus, such as rhodanine, 3-carbethoxyrhodanine, 3-(p-dimethylaminophenyl)-rhodanine, 3-ethylrhodanine, 3-phenylrhodanine, a barbituric acid nuclei (2, 4, 6-triketohexahydropyrimidine nucleus), a methyl-1-phenyl-5-thiopyrazolone nucleus, a thioindoxyl nucleus or like five-membered or six-membered heterocyclic nuclei.

A method for the preparation of these new dyes is described in my copending application Serial No. 739,502, filed August 11, 1934. The method of preparation comprises condensing a heterocyclic compound containing the following grouping as a part of its structure:

wherein A represents an atom such as oxygen or sulfur, with a condensation product of an alkyl quaternary salt of a benzoxazole containing a reactive methyl group with diphenylformamidine. Compounds containing the above-mentioned grouping are heterocyclic compounds, such as rhodanines, barbituric acid, thiobarbituric acid, 3-methyl-1-phenyl-5-thiopyrazolone and thioindoxyl, for example.

The following examples, taken from my copending application Serial No. 739,502, filed August 11, 1934, serve to illustrate the preparation of my new dyes. These examples are not intended to limit my invention.

*Example 1.—5-(2-ethyl-1-benzoxazylidene-ethylidene)-rhodanine*

1.33 parts of rhodanine, 4.34 parts of 1-β-acetanilidovinyl)-benzoxazole ethiodide and 0.9 part of anhydrous sodium acetate were refluxed in 50 parts of glacial acetic acid for about fifteen minutes. The dye separated from the hot solution. It was filtered off and recrystallized from glacial acetic acid, yielding brownish crystals with a bright blue reflex which gave a brownish-yellow solution in methyl alcohol. This dye has the following formula:

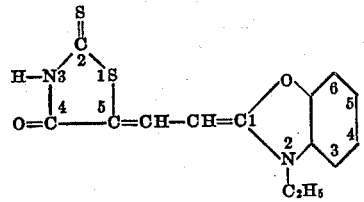

*Example 2.—3-amino-5-(2-ethyl-1-benzoxazylidene-ethylidene)-rhodanine*

1.5 parts of 3-aminorhodanine and 4.3 parts of 1-(β-acetanilidovinyl)-benzoxazole ethiodide were refluxed with 35 parts of absolute ethyl alcohol and 1.06 parts of triethylamine for about fifteen minutes. The dye was filtered from the cooled solution. It was recrystallized from acetone, yielding dull red crystals. The methyl alcohol solution was orange in color. This dye has the following formula:

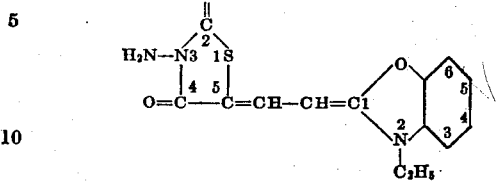

*Example 3.—3-carbethoxymethyl-5-(2-ethyl-1-benzoxazylidene-ethylidene)-rhodanine*

1.1 parts of 3-carbethoxymethylrhodanine and 2.2 parts of 1-(β-acetanilidovinyl)-benzoxazole ethiodide were refluxed with 20 parts of absolute ethyl alcohol and 0.53 part of triethylamine for about fifteen minutes. The dye was filtered from the cooled solution. It was recrystallized from glacial acetic acid, yielding reddish-orange crystals which gave an orange colored methyl alcohol solution. This dye has the following formula:

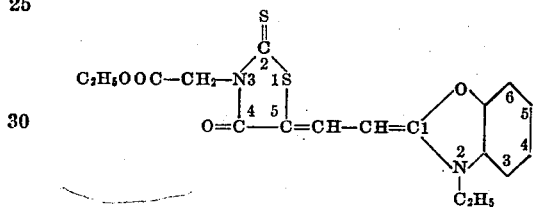

*Example 4.—3-(p-dimethylaminophenyl)-5-(2-ethyl-1-benzoxazylidene-ethylidene)-rhodanine*

1.25 parts of 3-(p-dimethylaminophenyl)-rhodanine and 2.2 parts of 1-(β-acetanilidovinyl)-benzoxazole ethiodide were refluxed with 25 parts of absolute ethyl alcohol and 0.53 part of triethylamine for about fifteen minutes. The due was filtered from the cooled solution. It was recrystallized from glacial acetic acid, yielding brown crystals with a green reflex and giving a yellow-orange methyl alcohol solution. This dye has the following formula:

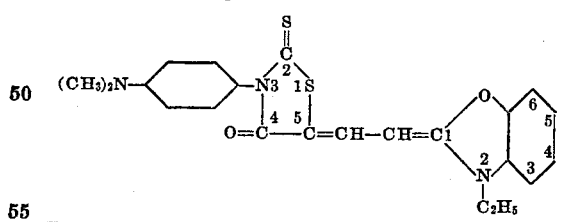

*Example 5.—3-ethyl-5-(2-ethyl-1-benzoxazylidene-ethylidene)-rhodanine*

0.8 part of 3-ethylrhodanine and 2.2 parts of 1-(β-acetanilidovinyl)-benzoxazole ethiodide were refluxed with 20 parts of absolute ethyl alcohol and 0.53 part of triethylamine. The dye was filtered from the cooled solution. It was recrystallized from glacial acetic acid, yielding red prisms with a blue reflex which gave an orange methyl alcohol solution. This dye has the following general formula:

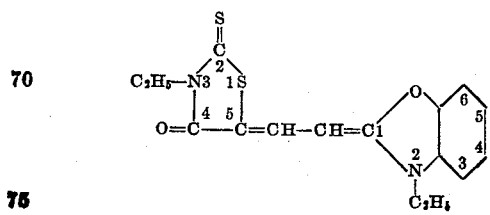

*Example 6.—5-(2-ethyl-1-benzoxazylidene-ethylidene)-3-phenylrhodanine*

2.1 parts of 3-phenylrhodanine and 4.3 parts of 1-(β-acetanilidovinyl)benzoxazole ethiodide were refluxed with 35 parts of absolute ethyl alcohol and 1.06 parts of triethylamine for about twenty minutes. The dye was filtered from the cooled solution and was filtered off. It was recrystallized from glacial acetic acid, yielding glistening red plates with a blue reflex which gave an orange methyl alcohol solution. This dye has the following formula:

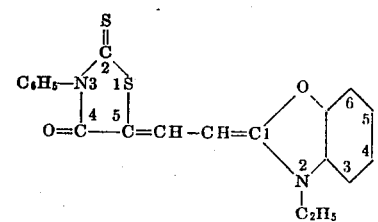

*Example 7.—5-(2-ethyl-1-benzoxazylidene-ethylidene)-3-phenylaminorhodanine*

1.1 parts of 3-phenylaminorhodanine and 2.2 parts of 1-(β-acetanilidovinyl)-benzoxazole ethiodide were refluxed with 25 parts of absolute ethyl alcohol and 0.53 part of triethylamine for about fifteen minutes. The dye was filtered from the cooled solution. It was recrystallized from glacial acetic acid, yielding reddish brown crystals which had a blue reflex and which gave a pinkish-orange methyl alcohol solution. This dye has the following formula:

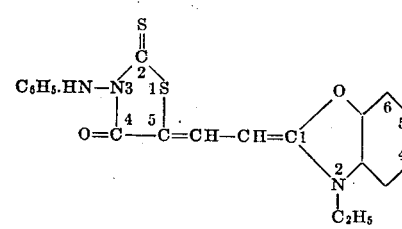

*Example 8.—5-(2-ethyl-1-benzoxazylidene-ethylidene)-2,4,6-triketohexahydropyrimidine*

1.3 parts of barbituric acid and 4.3 parts of 1-(β-acetanilidovinyl)-benzoxazole ethiodide were refluxed with 35 parts of absolute ethyl alcohol and 1.06 parts of triethylamine for about twenty minutes. The dye was filtered from the cooled solution. It was recrystallized from glacial acetic acid and yielded bright yellow crystals which gave a yellow methyl alcohol solution. This dye has the following formula:

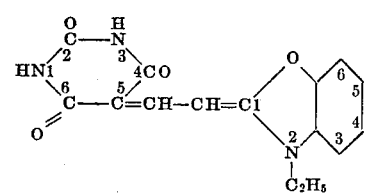

*Example 9.—5-(2-ethyl-1-benzoxazylidene-ethylidene)-2-thio-2,4,6-triketohexohydropyrimidine*

1.4 parts of thiobarbituric acid and 4.3 parts of 1-(β-acetanilidovinyl)-benzoxazole ethiodide were refluxed with 35 parts of absolute ethyl alcohol and 1.06 parts of triethylamine for about twenty minutes. The dye was filtered from the cooled solution. It was recrystallized from glacial acetic acid and yielded an orange-yellow crystalline powder which gave a yellow methyl alcohol solution. This dye has the following formula:

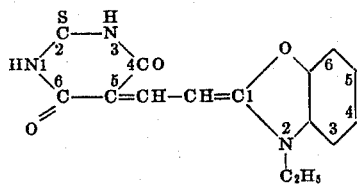

*Example 10.—4-(ethyl-1-benzoxazylidene-ethylidene)-3-methyl-1-phenyl-5-thiopyrazolone*

0.95 part of 3-methyl-1-phenyl-5-thiopyrazolone and 2.2 parts of 1-(β-acetanilidovinyl)-benzoxazole ethiodide were refluxed with 25 parts of absolute ethyl alcohol and 0.53 part of triethylamine for about fifteen minutes. The dye was filtered from the cooled solution. It was recrystallized from methyl alcohol, yielding brownish crystals with a green reflex which gave a reddish-orange methyl alcohol solution. This dye has the following formula:

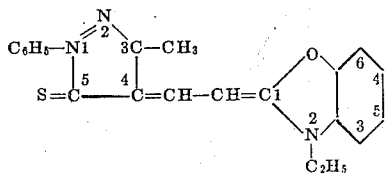

Condensation products of quaternary salts of benzoxazoles containing a reactive methyl group with diphenylformamidine can be prepared by heating the benzoxazole quaternary salts with diphenylformamidine advantageously in the presence of acetic anhydride. The following is illustrative of the preparation of such condensation products:

58 g. (1 mol.) of 1-methylbenzoxazole ethiodide and 40 g. (1 mol.) of diphenylformamidine and 250 cc. of acetic anhydride were refluxed for about twenty minutes. The condensation product separated from the reaction mixture. It can be employed without further purification, although it is advantageously washed with a small amount of acetone and dried, before using.

Still further examples of the preparation of my new benzoxazole dyes could be provided, but the foregoing will suffice to teach those skilled in the art the manner of preparing the dyes which I employ in preparing my new photographic emulsions. My new benzoxazole dyes are further described in my copending application Serial No. 138,815, filed of even date herewith.

My new benzoxazole dyes show a novel sensitizing action in photographic emulsions. My new dyes are particularly useful in preparing emulsions sensitive to the blue-green and green regions of the spectrum. To prepare emulsions sensitized with my new benzoxazole dyes, it is only necessary to thoroughly incorporate the dyes in the ordinary photographic gelatino-silver-halide emulsion by the simple methods well known to those skilled in the art. For example, to sensitize emulsions with the herein described dyes, a stock solution is first prepared by dissolving the dye in a suitable solvent, such as methyl alcohol, acetone or pyridine. Then, into one liter of a flowable photographic gelatino-silver-halide emulsion, an amount of the stock solution, diluted somewhat, if desired, containing about 0.010 g. of the desired dye is thoroughly incorporated. The so-prepared sensitized emulsion can then be coated upon a suitable support, such as glass, cellulose derivative, paper or the like, to a suitable thickness and allowed to dry. The details of such coating processes are well known to those skilled in the art. Photographic elements so prepared possess added sensitivity in the blue-green and green regions of the spectrum and have properties different from heretofore known emulsions sensitized to the green region of the spectrum.

The amount of dye which is actually incorporated in a given quantity of emulsion will, of course, vary from dye to dye and emulsion to emulsion, and the regulation at adoption of the most economical and useful proportion will be apparent to those skilled in the art upon observing the sensitizing power of the particular dye for the particular emulsion under consideration. The above proportions are, therefore, to be regarded only as illustrative and not to be understood as limiting my invention in any manner. Furthermore, it will be apparent that my new dyes can be incorporated in emulsions by other methods practiced in the art, as for instance, by bathing the plate or film upon which an emulsion has been coated in a solution of the dye in an appropriate solvent. This latter method of incorporating the dyes in emulsions, however, is not to be preferred over the first-described method of adding a solution of the dye to the emulsion. Clearly, the claims are intended to cover any combination of my new dyes with a photographic emulsion whereby the dye exerts a sensitizing effect upon the emulsion, particularly to the blue-green and green regions of the spectrum.

Under the class of gelatino-silver-halide emulsions, of course, are included all of the silver halides customarily employed in the art, but more particularly the silver chloride and silver bromide emulsions.

The accompanying drawing is by way of illustration and depicts the sensitivity of photographic emulsions containing four of my new benzoxazole dyes. Each figure of the drawing is a diagrammatic reproduction of a spectrogram showing the sensitivity of the emulsion. The emulsions employed in these illustrations were prepared by incorporating my new dyes in ordinary gelatino-silver-bromide emulsions. In Fig. 1, the curve depicts the sensitivity of an ordinary gelatino-silver-bromide emulsion containing 5-(2-ethyl-1-benzoxazylidene-ethylidene)-rhodanine. In Fig. 2, the curve represents the sensitivity of an ordinary gelatino-silver-bromide emulsion containing 3-ethyl-5-(2-ethyl-1-benzoxazylidene-ethylidene)-rhodanine. In Fig. 3, the curve depicts the sensitivity of an ordinary gelatino-silver-bromide emulsion containing 4-(2-ethyl-1-benzoxazylidene-ethylidene)-3-methyl-1-phenyl-5-thio-pyrazolone. In Fig. 4, the curve depicts the sensitivity of an ordinary gelatino-silver-bromide emulsion containing 5-(2-ethyl-1-benzoxazylidene-ethylidene)-3-phenylrhodanine.

Still further examples illustrating my invention could be cited, but the foregoing will be sufficient to teach those skilled in the art the manner in which my invention is carried out and the principles of sensitizing photographic emulsions with my new benzoxazole dyes. My new benzoxazole dyes, containing a five-membered heterocyclic nucleus containing a nuclear nitrogen and a nuclear sulfur atom, as in the case of rhodanine nuclei, give rise to emulsions of particular utility, as shown in the diagrammatic spectrograms of the drawing.

It should be understood that the hereindescribed dyes can probably exist in two forms, as follows:

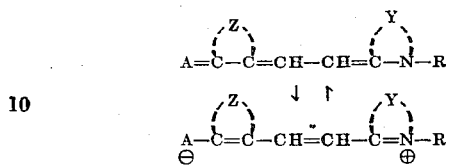

These forms are interconvertible, i. e. the forms are virtual tautomers.

What I claim as my invention and desire to be secured by Letters Patent of the United States is:

1. A photographic gelatino-silver-halide emulsion sensitized with a dye of the following formula:

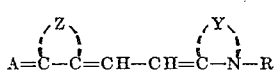

wherein A represents an atom selected from the group consisting of oxygen and sulfur, R represents an alkyl group, Y represents the non-metallic atoms necessary to complete a benzoxazole nucleus and Z represents the non-metallic atoms necessary to complete a heterocyclic nucleus selected from the group consisting of five-membered and six-membered heterocyclic nuclei.

2. A photographic gelatino-silver-halide emulsion sensitized with a dye of the following formula:

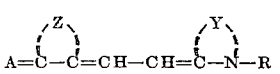

wherein A represents an atom selected from the group consisting of oxygen and sulfur, R represents an alkyl group, Y represents the non-metallic atoms necessary to complete a benzoxazole nucleus and Z represents the non-metallic atoms necessary to complete a five-membered heterocyclic nucleus containing a nuclear nitrogen and a nuclear sulfur atom.

3. A photographic gelatino-silver-halide emulsion sensitized with a dye of the following formula:

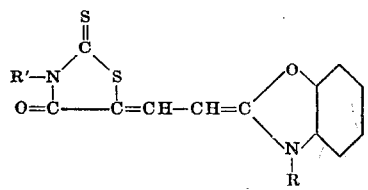

wherein R and R' represent alkyl groups.

4. A photographic gelatino-silver-halide emulsion sensitized with a dye of the following formula:

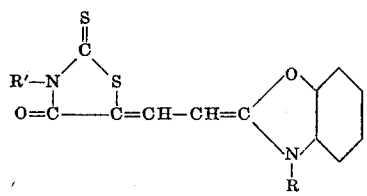

wherein R represents an alkyl group and R' represents an aryl group of the benzene series.

5. A photographic gelatino-silver-halide emulsion sensitized with 3-ethyl-5-(2-ethyl-1-benzoxazylidene-ethylidene)-rhodanine.

6. A photographic gelatino-silver-halide emulsion sensitized with a dye of the following formula:

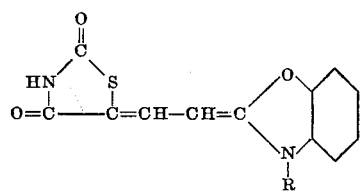

wherein R represents an alkyl group.

LESLIE G. S. BROOKER.